May 15, 1951   H. V. ATWELL   2,553,398
METHOD OF EFFECTING CATALYTIC CONVERSION
Filed Feb. 7, 1946
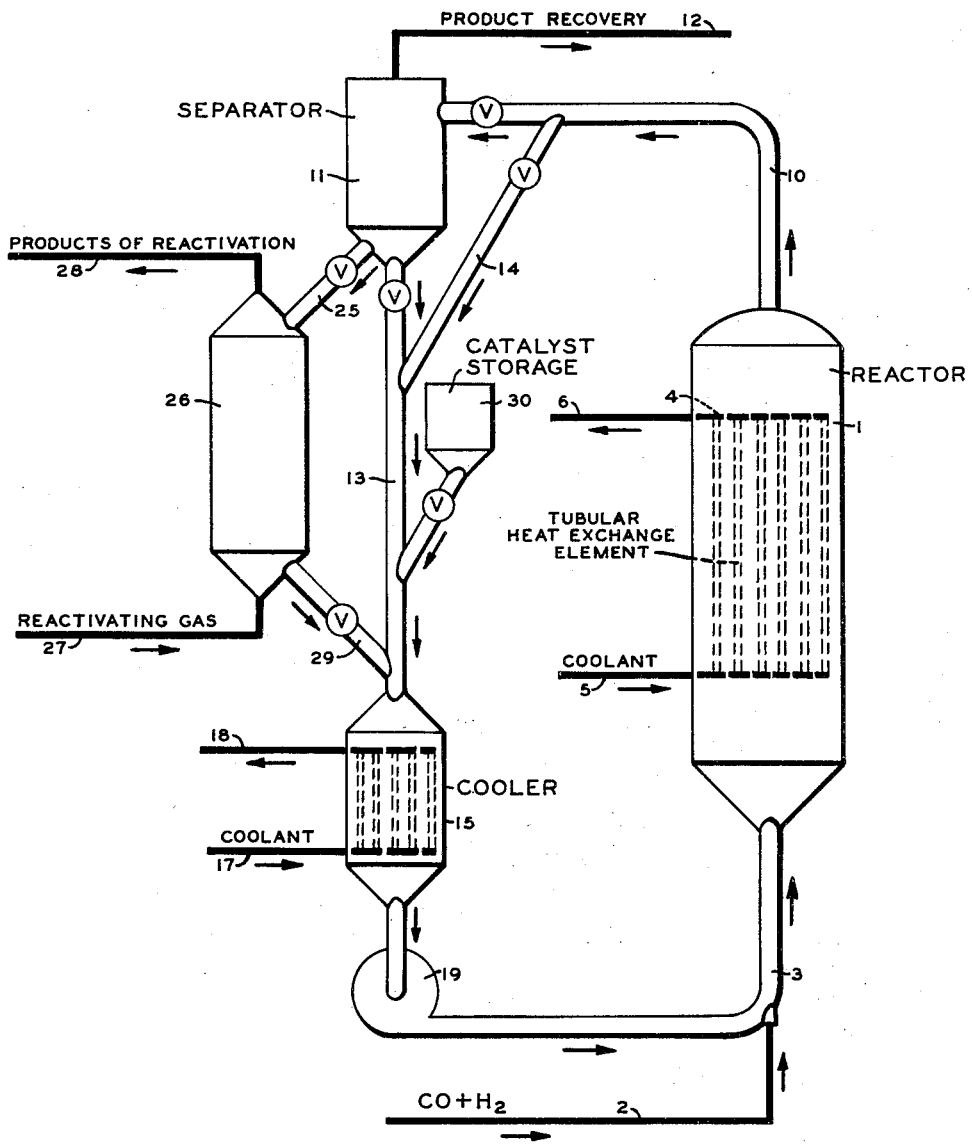
HAROLD V. ATWELL
INVENTOR
BY   HIS ATTORNEY Patented May 15, 1951

2,553,398

UNITED STATES PATENT OFFICE 2,553,398

METHOD OF EFFECTING CATALYTIC CONVERSION

Harold V. Atwell, Beacon, N. Y., assignor to The Texas Company, New York, N. Y., a corporation of Delaware Application February 7, 1946, Serial No. 646,037

5 Claims. (Cl. 260—449.6)

1

This invention relates to a method of effecting catalytic conversions wherein gaseous reactants flow through a reaction zone in contact with a suspended finely-divided solid catalyst.

In my pending application, Serial No. 533,901, for Method of Effecting Catalytic Conversions, filed May 3, 1944, now U. S. Patent 2,443,673, I have disclosed separate conversion reactions, i. e., endothermic and exothermic reactions carried out simultaneously in the presence of each other within a common reaction zone employing separate catalysts, one of which is confined within the reaction zone in the form of a mass of relatively coarse particles, while the other in relatively fine particle form is suspended in the gaseous reactants flowing through the mass of confined coarse catalyst particles. The suspended catalyst is removed with the reaction products separated therefrom and recycled with or without cooling to the reaction zone. As there disclosed, the confined coarse catalyst may be in the form of a fixed bed or may be in the form of a fluidized mass through which the rising reactant gas and relatively fine catalyst rise at sufficient velocity to maintain the coarse catalyst in a highly agitated condition, the linear flow being insufficient to carry the coarse catalyst particles out of the reactor.

The present application is concerned particularly with the carrying out of a single conversion reaction wherein the gaseous reactants containing suspended catalyst in powdered form or in the form of dust pass through a mass of fluidized relatively coarse material confined within the reaction zone and which coarse material preferably is inert with respect to the specific conversion reaction involved. The gaseous reactants and suspended catalyst powder flow through the fluidized mass of coarse particles under conditions such that the coarse particles are maintained in a state of substantially uniform fluidization along the vertical dimension of the reactor but such that there is no substantial entrainment of coarse particles in the effluent vapor stream from the reactor. There may be substantially no differential between the rate of flow of the vapor and the catalyst powder through the reaction zone. It is contemplated that the concentration of catalyst powder in the effluent stream from the reaction zone will be substantially the same as that in the stream entering the reaction zone.

The invention is of particular application to the catalytic conversion of carbon oxides and hydrogen for the production of hydrocarbons,

2 oxygenated hydrocarbons and the like. The passage of the fine catalyst powder through the reaction zone facilitates fluidizing of the coarse particles. The fluidized coarse particles impart turbulent and random, as contrasted with stream lined, movement to the catalyst particles. As a result the direction of flow of the fluids through the reaction zone undergoes constant change. As a consequence, there is a continual scrubbing action taking place wherein products of reaction are moved from the active surfaces of the catalyst particles into the main body of fluids and solids, and reactants are transferred from this main body to the catalyst surfaces, resulting in more effective utilization of the catalyst.

It also assures a uniformly high rate of heat transfer from the mass of fluid and solids to adjacent cooling surfaces. By providing sufficient cooling surface the catalyst particle temperatures can be kept within not more than about 5° F. of a predetermined reaction temperature level.

Accordingly, by means of this invention a given weight of catalyst converts a much larger quantity of synthesis gas per unit time than has been realized heretofore, which is possible because the reaction wherein carbon monoxide and hydrogen are converted into hydrocarbons takes place extremely rapidly. The invention thus involves suspending a relatively small quantity of catalyst powder in a unit volume of reactant gas, passing the suspension through the fluidized mass of substantially inert material to effect the catalytic reaction, separating suspended catalyst from effluent products of reaction and recycling the separated catalyst to the reaction zone. Advantageously a portion of the effluent stream of reaction products containing suspended catalyst as well as unreacted feed gas is continuously recycled through the reaction zone.

The catalyst powder consists of particles finer than about 100 mesh and preferably below about 270 mesh. Expressed in terms of particle size the preferred catalyst powder consists of particles within the range of 5 to 50 microns. The non-circulating coarse particles of inert material confined within the reaction zone may range from about 40 to 80 mesh or about 150 to 450 microns. The catalyst powder may comprise about 0.1 to 1.0 by weight of the total of solid particles both catalyst and inert in the system. The catalyst powder is suspended in the reactant gases to the extent of about 0.01 to 0.1 pound per cubic foot of reactant gas flowing through the reaction zone and measured at the temperature and pressure prevailing therein.

A preferred catalyst is an iron powder containing about 1 to 2% potassium oxide and about 2 to 3% alumina. However, it is contemplated that the catalyst may comprise other metals of the iron group such as cobalt, ruthenium, etc. Other promoters may be the oxides of thorium, magnesium, uranium and vanadium.

It is also contemplated that a supported type of catalyst may be used wherein a metal of the iron group is supported upon a material such as diatomaceous earth, silica gel, filtrols, etc.

The coarse particle material may be of a natural or synthetic gel type such as sand, silica gel, fuller's earth, although it is preferred to employ a metal or metal containing substance having a high heat conductivity. Thus coarse particles of an iron catalyst which have become spent in the synthesis reaction may be used.

My aforesaid pending application discloses transferring exothermic heat from the synthesis reaction to solid particles catalytically inert with respect to the synthesis reaction but active in promoting an endothermic conversion reaction taking place concurrently and in the presence of the synthesis reaction, the exothermic heat of the synthesis reaction being used to supply heat for the endothermic reaction.

The present invention contemplates transferring exothermic heat of reaction to metallic heat exchange surfaces provided within the reaction zone, these surfaces being sufficiently large in area to absorb the greater amount of heat evolved per weight of catalyst per unit time as a result of the more effective use of the catalyst.

The reaction zone may comprise a vertical shell containing a plurality of vertical tubes, one surface of which is in direct contact with a cooling liquid or fluid. According to one modification, the synthesis reaction may be carried out during passage of reactant gas and suspended catalyst through the interior of the tubes in which case the cooling liquid or fluid moves over the exterior surfaces of the tubes and the inert solid material is confined within the interior of the tubes. According to another modification, the cooling fluid may circulate through the interior of the tubes while the reactants and suspended catalyst rise through the inert solid particles confined in the spaces between the tubes.

In order to describe the operation of the invention, reference will now be made to the accompanying drawing.

The numeral 1 in the drawing designates a vertical reaction tower in which is maintained a mass of relatively coarse inert material in granular or particle form.

The synthesis gas is drawn from a source not shown and conducted through a pipe 2. This gas may contain carbon monoxide and hydrogen in the proportion of about 2 mols of hydrogen per mol of carbon monoxide. In addition, it may contain some carbon dioxide. Advantageously it is substantially free from steam.

The synthesis gas may be at a temperature ranging from about 100 to 600° F. depending upon the type of catalyst employed and the nature of the reaction products desired. The synthesis gas from the pipe 2 flows into a conduit 3 leading to the bottom of the reactor 1.

Catalyst powder, as will be explained subsequently, is suspended in the stream of synthesis gas rising through the conduit 3 and carried into the reactor 1. The velocity of gas flow upwardly through the reactor 1 is maintained sufficient to carry the suspended catalyst powder upwardly through the mass of coarse inert material, and the flowing stream of gas and suspended powder maintains the mass of coarse particle material in a state of uniform fluidization along the vertical dimension of the reactor.

During flow through the fluidized mass, the synthesis gas undergoes conversion into the desired products. Thus when converting carbon monoxide and hydrogen into a product comprising mainly hydrocarbons boiling within the range of gasoline using an iron powder as the synthesis catalyst a predetermined reaction temperature level within the range about 500 to 600° F. is maintained within the reactor.

The exothermic heat of reaction is removed from the reaction zone by means of a heat exchange element 4 indicated in broken lines. This element preferably comprises a plurality of vertical tubes through which a heat carried fluid is circulated. This fluid may be water, diphenyl, mercury, etc., and may undergo partial or substantially complete vaporization within the tubes.

As indicated in the drawing, the cooling fluid is introduced from a source not shown through a pipe 5 preferably to the lower ends of the vertical tubes and removed from the upper ends thereof through a pipe 6.

The products of reaction in vapor form and unreacted synthesis gas containing the suspended catalyst powder are removed as an effluent stream from the top of the reactor through a conduit 10.

As previously indicated, the velocity of gas and vapor flow through the reactor is sufficient to fluidize the inert coarse material but insufficient to cause substantial entrainment of the coarse particles in the effluent stream of vapor leaving the top of the reactor.

The effluent stream may be conducted in its entirety to a separator 11. This separator, while indicated as a single unit, may comprise one or more units provided with mechanical or electrical means for precipitating the catalyst powder from the vapor passing therethrough.

The vapor from which the catalyst has been separated is continuously discharged through a pipe 12 which leads to suitable cooling, separating and fractionating means of conventional type not shown.

The separated catalyst powder passes from the separator 11 into a standpipe 13.

If desired a portion of the effluent stream flowing through the conduit 10 may be diverted through a conduit 14 communicating directly with the standpipe 13. In this case the diverted material comprising vapor and suspended catalyst powder flows downwardly through the standpipe 13 for return to the reactor either with or without cooling.

Such cooling as may be desired can be effected in a cooling section 15 wherein the mixture of fluid and suspended powder flows in indirect heat exchange relationship with a suitable cooling medium. The cooling element within the section 15 may be substantially similar to the heat exchange element 4 in the reactor 1 with provision for introducing a cooling liquid or fluid through a pipe 17 and removing it through a pipe 18.

The extent to which the temperature of the recycle stream is reduced will depend upon its volume and powder content. For example, the temperature reduction may range from about 5 to 50° F. In any case, the temperature should not be reduced sufficiently to cause appreciable condensation of the liquefiable constituents of the recycle stream.

The recycle stream of vapor exclusive of its catalyst powder content may range from about 1 to 10 volumes per volume of fresh synthesis gas feed and usually will amount to about 3 to 5 volumes of recycle per volume of fresh feed.

With recycling of a portion of the effluent through the conduit 14 the portion of the effluent flowing into the separator 11 will contain only the net production of hydrocarbon products from the reaction. The catalyst powder separated in the separator 11 in such case is added to the recycle stream.

A blower 19 is provided for the purpose of forcing the recycled vapor and suspended powder into the conduit 3 for return to the reactor.

Although the active life of the synthesis catalyst is relativey long, nevertheless provision may be made for continuously removing a small stream from the reactor 2 for reactivation. In such case, the catalyst is drawn off through a conduit 25 to a reactivator 26 wherein it is reactivated in conventional manner to remove accumulated waxy material if any and thereafter to reduce the catalyst to its active form. The activating and reducing treatment may be effected with hydrogen although it is contemplated that the reduction may involve treatment with carbon monoxide or a gas containing a relatively high proportion of carbon monoxide.

As indicated the reactivating gas is drawn from a source not shown through a pipe 27 while the products of reaction are discharged through a pipe 28. The reactivated and reduced catalyst is returned to the system through conduit 29. It is contemplated that the reactivator may comprise more than 1 unit so that removal of carbonaceous material and reduction of the catalyst may be carried out in separate zones.

By way of illustration, when operating the process for the production of hydrocarbons the reactor 1 contains a mass of relatively inactive iron particles of about 40 to 80 mesh. Synthesis gas consisting of about 1 mol of carbon monoxide to 2 mols of hydrogen is introduced through the conduit 2 at a temperature of about 550° F. The synthesis gas mixed with recycle gas flows through the conduit 3 containing about 0.01 to 0.10 pound of powdered catalyst per cubic foot (standard conditions) of mixed gas flowing through the conduit 3. The catalyst comprises an active iron powder promoted with about 1 to 2% potassium oxide and 2 to 3% alumina and consists of particles of about 100 to 150 mesh.

The gaseous mixture flowing through the conduit 3 comprises about 5 volumes of recycle gas per 1 volume of fresh synthesis feed gas and the gaseous mixture is introduced at the rate of about 1000 cubic feet (standard conditions) per cubic foot of effective reactor volume.

The reaction zone is maintained at a temperature of about 600° F. so that carbon monoxide and hydrogen passing therethrough is converted into hydrocarbons comprising mainly gasoline hydrocarbons.

The hydrocarbons are fractionated from the product stream discharged through the pipe 12 and the yield of $C_5$ and heavier hydrocarbons amounts to approximately 1 gallon of hydrocarbons per thousand cubic feet of fresh synthesis gas.

Make-up catalyst that may be required can be supplied from a storage hopper 30.

While mention has been made of specific temperature conditions, it is contemplated that the temperatures may range from about 200 to 700° F. depending upon the catalyst employed and the type of synthesis product desired. Instead of producing hydrocarbons, the process may be operated for the production of oxygenated compounds.

The invention is also applicable to other types of exothermic reactions and may have application in the carrying out of endothermic conversion reactions wherein it is desired to supply heat to the reaction zone in order to compensate for the change in heat content of the reactant mixture within the reaction zone as a result of the endothermic nature of the reaction.

Obviously many modifications and variations of the invention as above set forth may be made without departing from the spirit and scope thereof, and therefore only such limitations should be imposed as are indicated in the appended claims.

I claim:

1. A process for effecting catalytic hydrogenation of carbon oxides to produce desired products of reaction such as hydrocarbons, oxygenated hydrocarbons and the like by contact with a powdered catalyst in contact with a heat exchange surface within a reaction zone maintained under conversion conditions including a predetermined elevated conversion temperature which comprises disposing within a vertical reaction zone, in contact with said heat exchange surface a mass of inert solid contact material in relatively coarse particle form, continuously introducing to the lower portion of said zone a reactant vapor stream comprising carbon monoxide and hydrogen, suspending in the reactant vapor catalyst powder in relatively fine particle form, passing said vapor containing suspended catalyst powder upwardly through said mass of coarse particles with sufficient velocity to maintain said coarse particles in a state of fluidization along the vertical dimension of said reaction zone but without substantial entrainment of said coarse particles from the reaction zone, effecting substantial conversion of carbon monoxide and hydrogen into the desired product, exchanging heat between the fluidized mass and said heat exchange surface, continuously removing from the upper portion of said reaction zone the effluent reaction products containing suspended catalyst powder, separating said effluent into a plurality of streams, recovering desired products of reaction from one of said streams and recycling another of said streams containing suspended catalyst powder to the lower portion of the reaction zone.

2. A process for effecting catalytic hydrogenation of carbon oxides to produce desired products of reaction such as hydrocarbons, oxygenated hydrocarbons and the like by contact with a powdered catalyst in contact with a heat exchange surface within a reaction zone maintained under conversion conditions including a predetermined elevated conversion temperature which comprises disposing within a vertical reaction zone in contact with said heat exchange surface a mass of inert solid contact material in relatively coarse particle form, continuously introducing to the lower portion of said zone a reactant vapor stream comprising carbon monoxide and hydrogen, suspending in the reactant vapor catalyst powder in relatively fine particle form, passing said vapor containing suspended catalyst powder upwardly through said mass of coarse particles with sufficient velocity to maintain said coarse particles in a state of fluidization along the vertical dimension of said reaction zone but without substantial entrainment of said coarse particles from the reaction zone, effecting substantial conversion of carbon monoxide and hydrogen into the desired product, exchanging heat between the fluidized mass and said heat exchange surface, continuously removing from the upper portion of said reaction zone an effluent stream of reaction products containing suspended catalyst powder, splitting said effluent into separate streams, recycling one of said separate streams containing suspended powder to the lower portion of the reaction zone, and recovering products of reaction from the non-recycled stream.

3. A process for effecting catalytic hydrogenation of carbon oxides to produce desired products of reaction such as hydrocarbons, oxygenated hydrocarbons and the like by contact with a powdered catalyst in contact with a heat exchange surface within a reaction zone maintained under conversion conditions including a predetermined elevated conversion temperature which comprises disposing within a vertical reaction zone in contact with said heat exchange surface a mass of inert solid contact material in relatively coarse particle form, continuously introducing to the lower portion of said zone a reactant vapor stream comprising carbon monoxide and hydrogen, suspending in the reactant vapor catalyst powder in relatively fine particle form, passing said vapor containing suspended catalyst powder upwardly through said mass of coarse particles with sufficient velocity to maintain said coarse particles in a state of fluidization along the vertical dimension of said reaction zone but without substantial entrainment of said coarse particles from the reaction zone, effecting substantial conversion of carbon monoxide and hydrogen into the desired product, exchanging heat between the fluidized mass and said heat exchange surface, continuously removing from the upper portion of said reaction zone an effluent stream of reaction products containing suspended catalyst powder, splitting said effluent into separate streams, recycling one of said streams containing suspended powder to the lower portion of the reaction zone, separately removing from the non-recycled stream products of reaction and suspended catalyst, discharging separate products of reaction, and recycling separated catalyst to the reaction zone.

4. The process according to claim 2 in which the recycled stream is partially cooled prior to return to the reaction zone.

5. The process according to claim 3 in which the recycled stream is partially cooled prior to return to the reaction zone.

HAROLD V. ATWELL.

REFERENCES CITED

The following references are of record in the file of this patent:

UNITED STATES PATENTS

| Number | Name | Date |
|---|---|---|
| 2,360,787 | Murphree et al. | Oct. 17, 1944 |
| 2,376,564 | Upham et al. | May 22, 1945 |
| 2,383,636 | Wurth | Aug. 25, 1945 |
| 2,393,636 | Johnson | Jan. 29, 1946 |
| 2,393,909 | Johnson | Jan. 29, 1946 |
| 2,396,109 | Martin | Mar. 5, 1946 |
| 2,417,164 | Huber, Jr. | Mar. 11, 1947 |
| 2,443,673 | Atwell | June 22, 1948 |